(12) United States Patent
Kobayashi et al.

(10) Patent No.: US 8,406,618 B2
(45) Date of Patent: Mar. 26, 2013

(54) CAMERA

(75) Inventors: Daizo Kobayashi, Hirakata (JP); Tomochika Teranaka, Kawachinagano (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 12/956,144

(22) Filed: Nov. 30, 2010

(65) Prior Publication Data

US 2011/0129208 A1     Jun. 2, 2011

(30) Foreign Application Priority Data

Nov. 30, 2009    (JP) .................................. 2009-272155

(51) Int. Cl.
    *G03B 15/03*      (2006.01)
    *G03B 7/26*       (2006.01)
    *G03B 17/02*      (2006.01)

(52) U.S. Cl. .......................... 396/176; 396/205; 396/535

(58) Field of Classification Search .............. 396/6, 205, 396/206, 176–178, 535; 348/373–376
See application file for complete search history.

(56) References Cited

U.S. PATENT DOCUMENTS

| 6,574,430 | B1 * | 6/2003 | Constable | .......................... 396/6 |
| 6,600,879 | B2 * | 7/2003 | Ito | .................................. 396/176 |
| 2006/0114348 | A1 | 6/2006 | Fujii et al. | |

FOREIGN PATENT DOCUMENTS

| JP | 10-254096 A | 9/1998 |
| JP | 2004-208228 A | 7/2004 |

\* cited by examiner

*Primary Examiner* — W. B. Perkey
*Assistant Examiner* — Minh Phan
(74) *Attorney, Agent, or Firm* — Westerman, Hattori, Daniels & Adrian, LLP (57) ABSTRACT

A camera according to the present invention includes a camera body where an image pickup mechanism is mounted, and a strobe unit is provided in the camera body. A wiring board to which a lead wire to be electrically connected to the strobe unit is connected, and a capacitor connected to the wiring board to feed power to the strobe unit are incorporated in the camera body. The wiring board and the capacitor are provided in a vertically movable manner in the camera body, and a cantilever portion for biasing the wiring board and the capacitor downward, and a lower projection portion for receiving movement of the wiring board and the capacitor due to a biasing force of the cantilever portion are provided in the camera body.

5 Claims, 8 Drawing Sheets

CAMERA

Japanese Patent Application No. 2009-272155 on which the priority claim of this patent application is based is incorporated herein by reference.

BACKGROUND OF THE INVENTION

1. Field of the Invention

The present invention relates to a camera where a strobe unit is provided in a camera body, or where a strobe unit is detachable from a camera body.

2. Description of the Related Art

Figure 8:
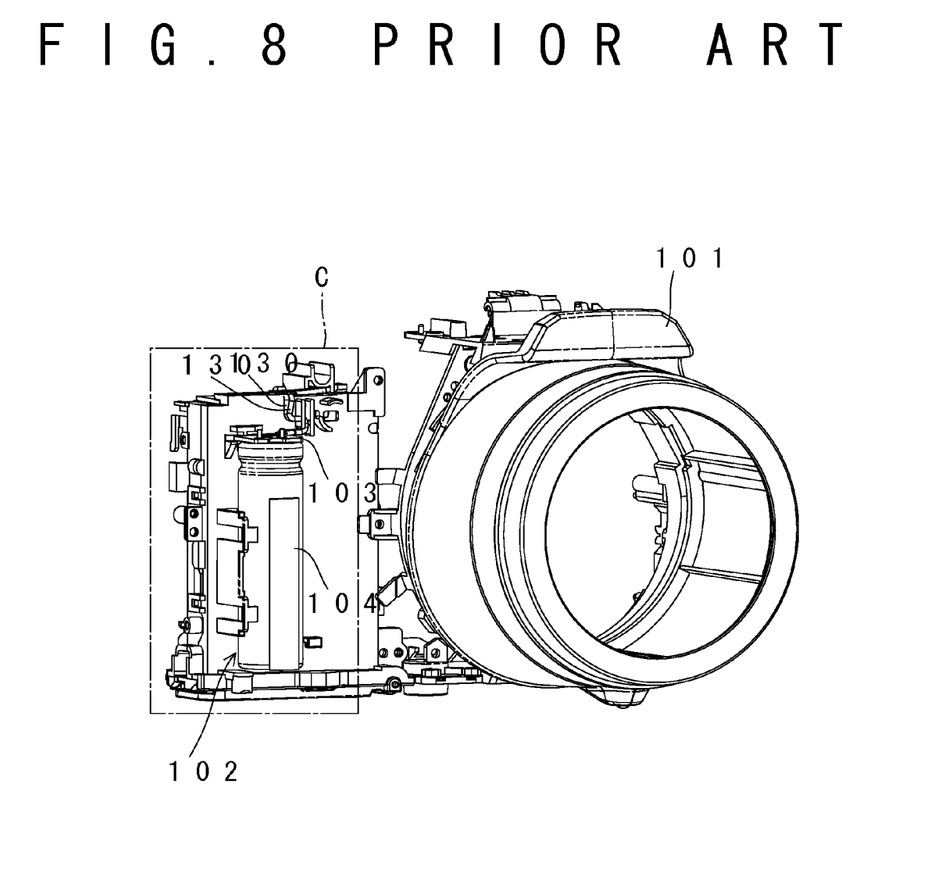
FIG. 8 is a perspective view showing the configuration of a camera body of a conventional camera.

In this type of camera, a wiring board (103) to which two lead wires (130) and (130) to be electrically connected to a strobe unit (not shown) are connected, and a capacitor (104) soldered to the wiring board (103) to feed power to the strobe unit, are incorporated in a camera body (101) as shown in FIG. 8.

In conventional cases, the wiring board (103) and the capacitor (104) are accommodated in an accommodating chamber (102) formed inside a grip portion of the camera body (101), and the wiring board (103) is fixed to the camera body (101) at an upper position inside the accommodating chamber (102) with the capacitor (104) soldered to the wiring board (103) being directed downward.

Meanwhile, there is generally a tolerance associated with the length dimension of the capacitor (104). In conventional cases, a length dimension L0 (see FIG. 9) of a space where the capacitor (104) is to be accommodated in the accommodating chamber (102) is set to be larger than the maximum length dimension of the capacitor (104) such that even the capacitor (104) having a greater length dimension with the tolerance can be mounted in the camera body (101).

Figure 9:
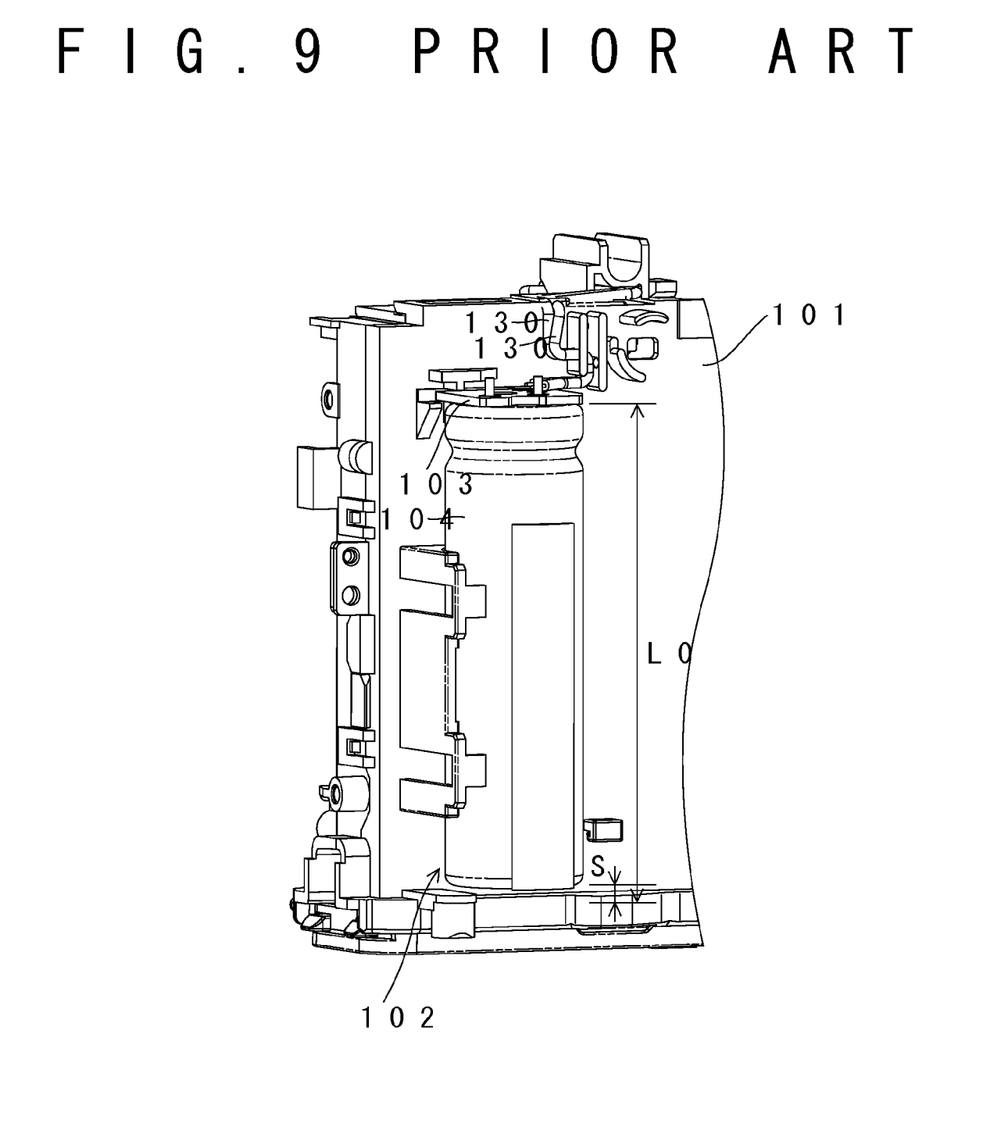
FIG. 9 is an enlarged view of the C region shown in FIG. 8.

In the camera, however, a gap S is formed on the distal end side of the capacitor (104) accommodated in the accommodating chamber (102) as shown in FIG. 9. The wiring board (103) is fixed to the camera body. Thus, when a large downward force is applied to the capacitor (104) due to an impact on the camera, a force to separate the wiring board (103) and the capacitor (104) from each other acts therebetween. Accordingly, electrical connection between the wiring board (103) and the capacitor (104) is easily cut off in the conventional camera when an impact is applied to the camera.

For example, the two lead wires (130) and (130) to be electrically connected to the strobe unit may be directly connected to the capacitor (104). However, the efficiency of assembling operation is thereby reduced.

SUMMARY OF THE INVENTION

A camera according to the present invention includes a camera body where an image pickup mechanism is mounted, a strobe unit being provided in the camera body, or being detachable from the camera body, wherein a wiring board to which a lead wire to be electrically connected to the strobe unit is connected, and a capacitor connected to the wiring board to feed power to the strobe unit are incorporated in the camera body. The wiring board and the capacitor are provided movably in a predetermined direction in the camera body, and a biasing portion for biasing the wiring board and the capacitor in the predetermined direction, and a receiving portion for receiving movement of the wiring board and the capacitor due to a biasing force of the biasing portion are provided in the camera body.

DETAILED DESCRIPTION OF THE PREFERRED EMBODIMENTS

Figure 1:
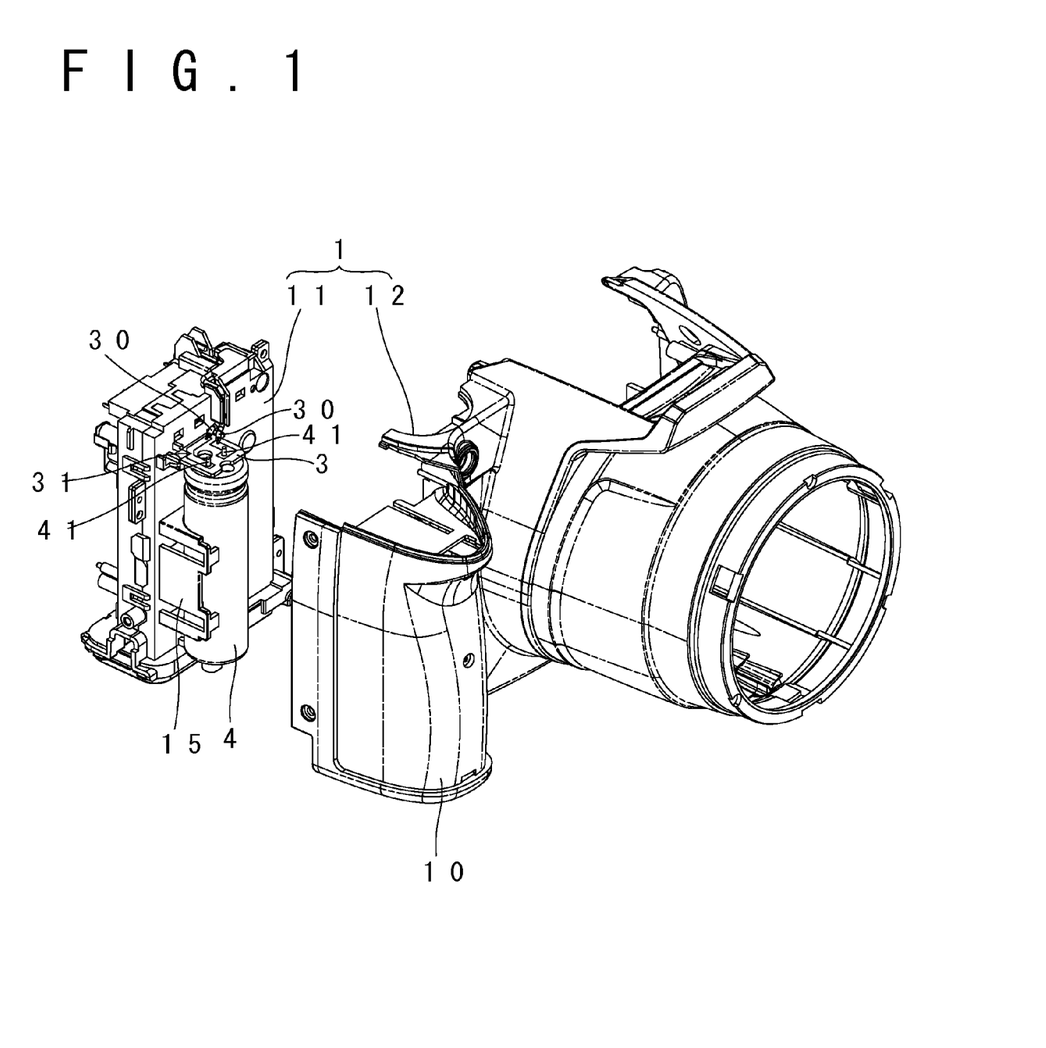
FIG. 1 is an exploded perspective view of a camera according to one embodiment of the present invention as viewed from the front surface side.

In the following, an embodiment of the present invention will be specifically described by reference to the drawings. As shown in FIG. 1, a camera according to one embodiment of the present invention includes a camera body (1) where an image pickup mechanism (not shown) is mounted. A strobe unit (not shown) is provided in the camera body (1).

A wiring board (3) to which two lead wires (30) and (30) to be electrically connected to the strobe unit are connected, and a capacitor (4) connected to the wiring board (3) to feed power to the strobe unit are also incorporated in the camera body (1). The two lead wires (30) and (30) are connected to the strobe unit via a control board (not shown) that controls the photographing operation of the camera. Of course, the two lead wires (30) and (30) may be directly connected to the strobe unit.

The capacitor (4) includes a cylindrical body portion and a pair of lead terminals (41) and (41) drawn out of the body portion. For example, a capacitor having a capacitance of 200 $\mu F$ is used as the capacitor (4).

A wiring pattern (31) is formed on the surface of the wiring board (3). The two lead wires (30) and (30) are connected to the wiring pattern (31), and the pair of lead terminals (41) and (41) of the capacitor (4) are soldered to the wiring pattern (31) while penetrating the wiring board (3) from the rear surface to the front surface thereof. The lead terminals (41) of the capacitor (4) are thereby electrically connected respectively to the lead wires (30) corresponding to the lead terminals (41) via the wiring pattern (31). The capacitor (4) is thereby electrically connected to the pair of lead wires (30) and (30) via the wiring board (3). Since the wiring board (3) is used for the electrical connection between the capacitor (4) and the pair of lead wires (30) and (30), the efficiency of camera assembling operation is improved. Electronic parts may be also mounted on the wiring board (3).

Figure 2:
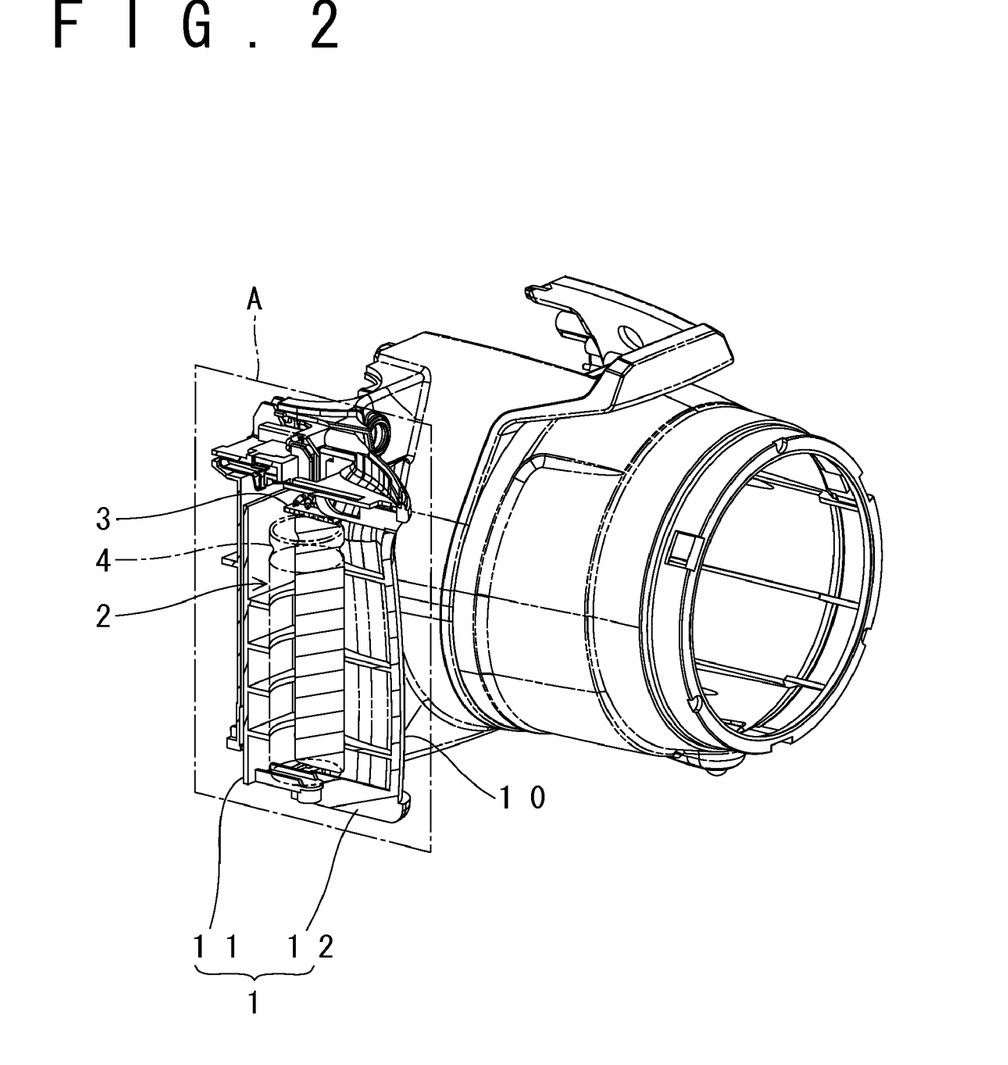
FIG. 2 is a perspective view showing the camera in a partly broken manner.

As shown in FIG. 1, a grip portion (10) raised toward the front of the camera body (1) is provided in the camera body (1). Two body constituent members (11) and (12) constituting the camera body (1) are bonded together, so that an accommodating chamber (2) is vertically formed inside the grip portion (10) as shown in FIG. 2. The wiring board (3) and the capacitor (4) are accommodated in the accommodating chamber (2) without being fixed to the camera body (1). The wiring board (3) is arranged at an upper position inside the accommodating chamber (2) with the capacitor (4) soldered to the wiring board (3) being directed downward.

Figure 3:
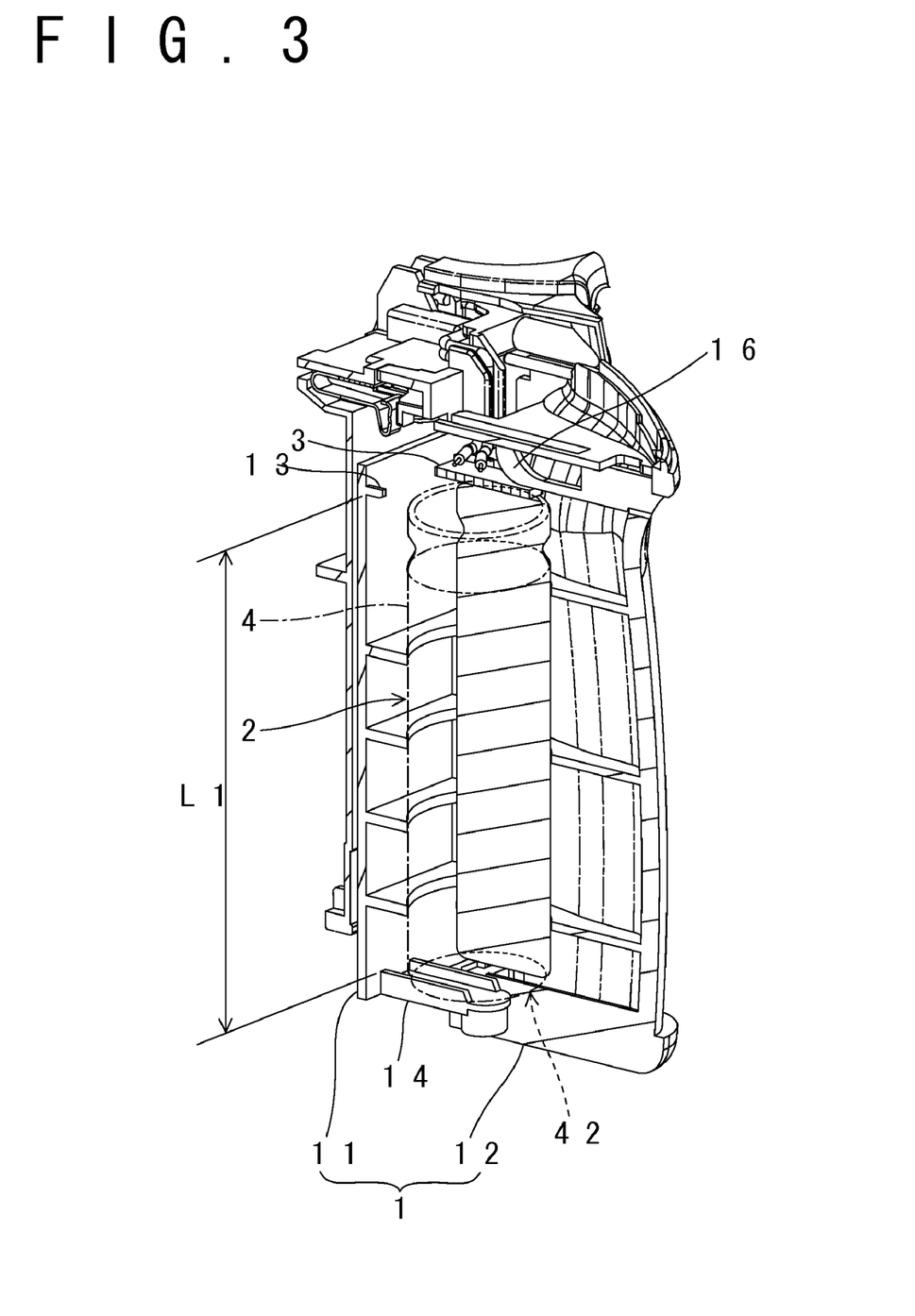
FIG. 3 is an enlarged view of the A region shown in FIG. 2.
Figure 4:
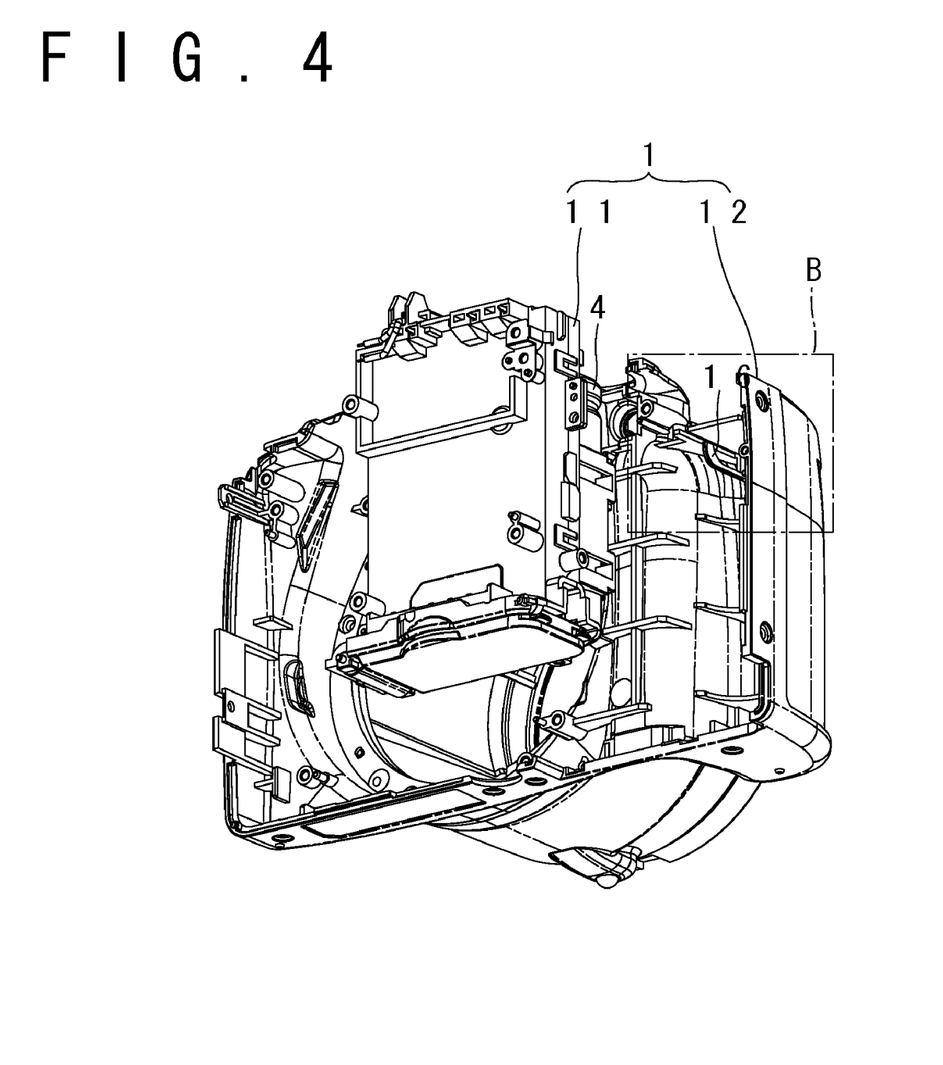
FIG. 4 is an exploded perspective view of the camera as viewed from the rear surface side.

As shown in FIG. 3, an upper projection portion (13) defining the upper end of the accommodating chamber (2) and a lower projection portion (14) defining the lower end of the accommodating chamber (2) are formed in the first body constituent member (11) of the two body constituent members (11) and (12). A length dimension L1 from the upper projection portion (13) to the lower projection portion (14) is set to be larger than the maximum dimension of the wiring board (3) and the capacitor (4) in the vertical direction. That is, the accommodating chamber (2) has a larger vertical dimension than the maximum vertical dimension of the wiring board (3) and the capacitor (4).

Also, as shown in FIG. 1, a holding portion (15) for holding the capacitor (4) in a vertically movable manner is formed in the first body constituent member (11).

Accordingly, the wiring board (3) and the capacitor (4) are accommodated in the accommodating chamber (2) in a vertically movable manner while being attached to the first body constituent member (11) by the holding portion (15). The upward movement of the wiring board (3) and the capacitor (4) is received by the upper projection portion (13) with the surface of the wiring board (3) abutting against the upper projection portion (13). The downward movement of the wiring board (3) and the capacitor (4) is received by the lower projection portion (14) with a distal end surface (42) of the capacitor (4) abutting against the lower projection portion (14).

Figure 5:
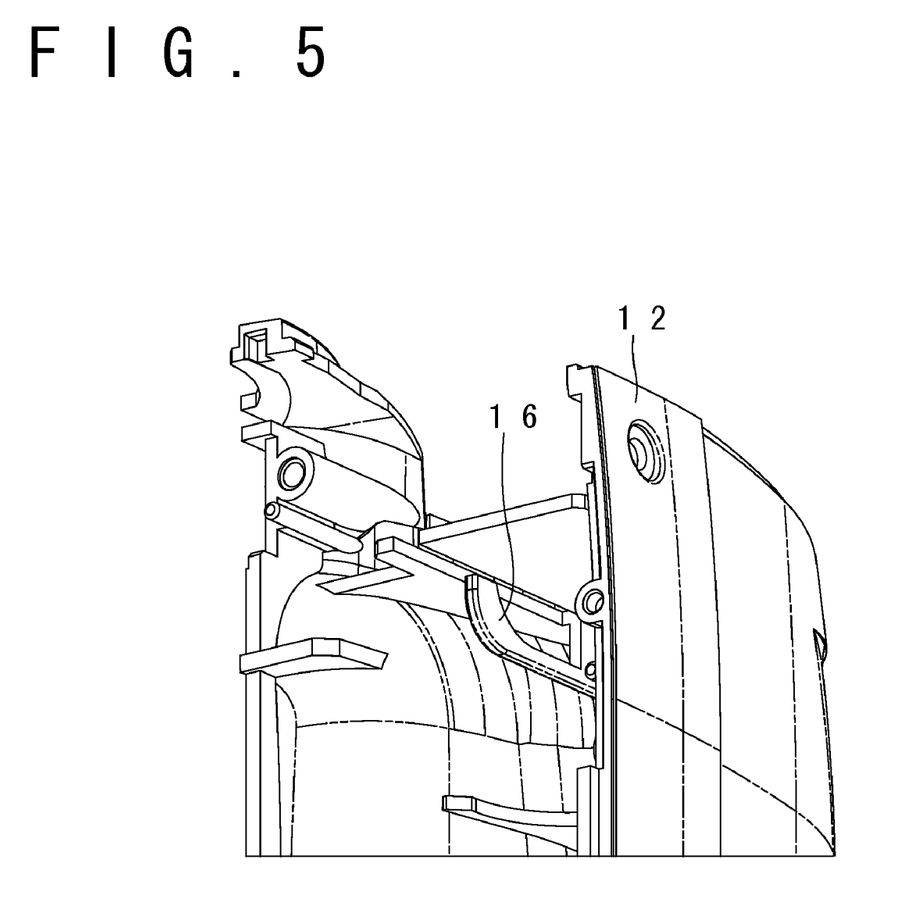
FIG. 5 is an enlarged view of the B region shown in FIG. 4.
Figure 6:
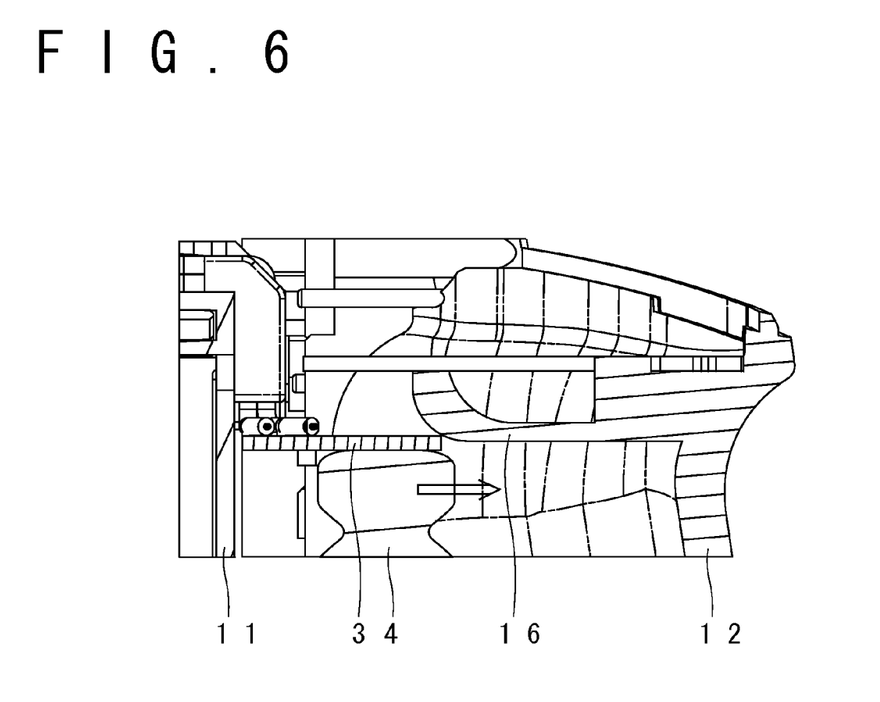
FIG. 6 is a sectional view for explaining a state in which two body constituent members constituting a camera body are half-assembled.

As shown in FIG. 3, a cantilever portion (16) extending in a direction substantially perpendicular to the vertical direction and capable of deflecting by a vertical force is formed in the second body constituent member (12) of the two body constituent members (11) and (12). The cantilever portion (16) has such a shape that its distal end portion is curved upward as shown in FIGS. 3 and 5. Also, the cantilever portion (16) is provided at such a position that the wiring board (3) is brought into abutment against the distal end portion of the cantilever portion (16) from the perpendicular direction in the course where the two body constituent members (11) and (12) are assembled as shown in FIG. 6. The cantilever portion (16) is molded from resin integrally with the second body constituent member (12).

Figure 7:
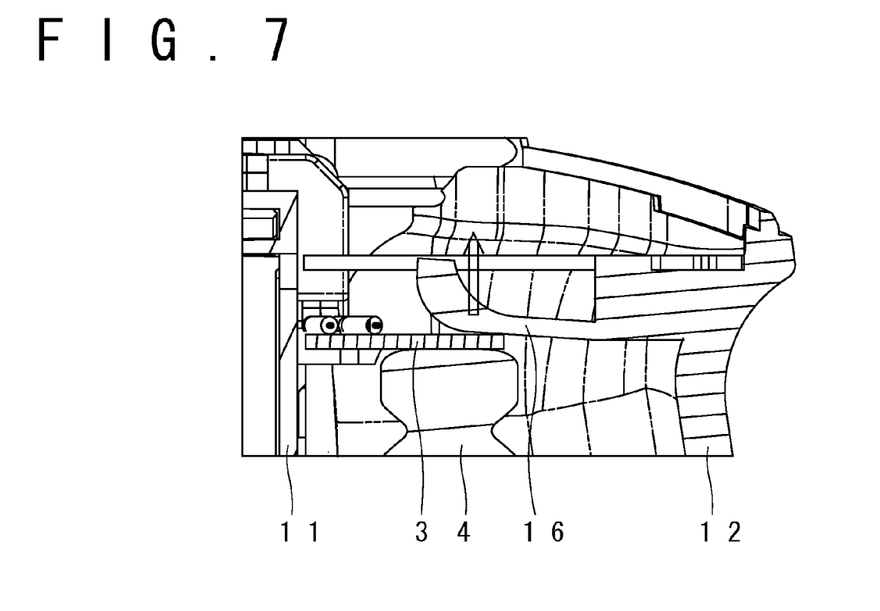
FIG. 7 is a sectional view for explaining a state in which the two body constituent members have been assembled.

Therefore, when the wiring board (3) and the capacitor (4) attached to the first body constituent member (11) are inserted into the second body constituent member (12) to assemble the two body constituent members (11) and (12), the wiring board (3) is brought into abutment against the distal end portion of the cantilever portion (16) in the course of insertion as shown in FIG. 6. Subsequently, the wiring board (3) and the capacitor (4) are further pushed into the second body constituent member (12). An upward force is thereby applied to the distal end portion of the cantilever portion (16), and the cantilever portion (16) deflects upward as shown in FIG. 7. As a result, the distal end portion of the cantilever portion (16) rides over the surface of the wiring board (3), so that the assembling of the two body constituent members (11) and (12) is completed.

When the distal end portion of the cantilever portion (16) rides over the surface of the wiring board (3) with the cantilever portion (16) deflecting upward as described above, a downward biasing force is applied to the wiring board (3) and the capacitor (4) from the cantilever portion (16). That is, the cantilever portion (16) functions as a biasing portion to bias the wiring board (3) and the capacitor (4) downward.

In the aforementioned camera, both of the wiring board (3) and the capacitor (4) are vertically movable. Therefore, the capacitor (4) can move in the vertical direction integrally with the wiring board (3) to which the capacitor (4) is connected. Thus, even when a large force is vertically applied to the capacitor (4) due to an impact on the camera, a force to separate the wiring board (3) and the capacitor (4) from each other is hardly generated therebetween. Thus, the electrical connection between the wiring board (3) and the capacitor (4) is hardly cut off.

In the aforementioned camera, while the wiring board (3) and the capacitor (4) are biased downward by the cantilever portion (16), the downward movement of the wiring board (3) and the capacitor (4) due to the biasing force of the cantilever portion (16) is received by the lower projection portion (14). That is, the lower projection portion (14) functions as a receiving portion to receive the movement of the wiring board (3) and the capacitor (4) due to the biasing force of the cantilever portion (16). Accordingly, the wiring board (3) and the capacitor (4) are arranged at a predetermined position defined by the cantilever portion (16) and the lower projection portion (14).

In the configuration in which the wiring board (3) and the capacitor (4) are attached to the first body constituent member (11) and the cantilever portion (16) is formed in the second body constituent member (12) as in the aforementioned camera, the position of the wiring board (3) and the capacitor (4) may be displaced upward from a predetermined position before the two body constituent members (11) and (12) are assembled. Even in this case, when the two body constituent members (11) and (12) are assembled (see FIGS. 6 and 7), the wiring board (3) and the capacitor (4) are moved downward by the biasing force of the cantilever portion (16), and the movement due to the biasing force is received by the lower projection portion (14). As a result, the wiring board (3) and the capacitor (4) are set at the predetermine position.

Moreover, in the aforementioned camera, the accommodating chamber (2) has a larger vertical dimension than the maximum vertical dimension of the wiring board (3) and the capacitor (4). Therefore, the capacitor (4) having a greater length dimension with a tolerance can be mounted in the camera body (1).

Please note that the configuration of each portion of the present invention is not limited to that in the aforementioned embodiment, and various modifications may be made therein by a person skilled in the art without departing from the spirit of the present invention as expressed in the claims. For example, the wiring board (3) is arranged in the aforementioned camera with the capacitor (4) soldered to the wiring board (3) being directed downward. However, the present invention is not limited thereto. Various components employed in the aforementioned camera may be also applied to a camera where the wiring board (3) is arranged with the capacitor (4) being directed in various directions such as an upward direction or a horizontal direction.

Also, in the aforementioned camera, the cantilever portion (16) is provided at the position such that the wiring board (3) is brought into abutment against the distal end portion of the cantilever portion (16) from the perpendicular direction in the course where the two body constituent members (11) and (12) are assembled. However, the present invention is not limited thereto. For example, the cantilever portion (16) may be provided at such a position that an angular portion on the distal end of the capacitor (4) is brought into abutment against the distal end portion of the cantilever portion (16) from the perpendicular direction in the course where the two body constituent members (11) and (12) are assembled. In this case, when the two body constituent members (11) and (12) are assembled, the distal end portion of the cantilever portion (16) rides over the distal end surface (42) of the capacitor (4) with the cantilever portion (16) deflecting downward, and an upward biasing force is thereby applied to the wiring board (3) and the capacitor (4) from the cantilever portion (16).

Furthermore, in the aforementioned camera, different biasing portion and receiving portion may be employed instead of the cantilever portion (16) and the lower projection portion (14). For example, an elastic member such as a spring may be employed as the biasing portion instead of the cantilever portion (16). Also, an inner surface of the camera body (1) may be employed as the receiving portion instead of the lower projection portion (14).

Furthermore, various components employed in the aforementioned camera may be also applied to a camera where the strobe unit is detachable from the camera body (1).

What is claimed is:

1. A camera, comprising:
    a camera body, said camera body having a first body constituent member and a second body constituent member,
    an image pickup mechanism mounted to the camera body,
    a strobe unit either provided in the camera body, or detachable from the camera body,
    a wiring board to which a lead wire to be electrically connected to the strobe unit is connected, and a capacitor connected to the wiring board to feed power to the strobe unit are incorporated in the camera body, the wiring board is integrated with the capacitor via the lead wire, and
    a holding portion, to hold the capacitor in a vertically movable manner, is formed in the first body constituent member and a biasing portion, with a distal end portion curved upwards in a direction away from an upper surface of the wiring board, is formed in the second body constituent member,
    wherein the wiring board and the capacitor are provided movably along a predetermined direction in the camera body, and the biasing portion to bias the wiring board and the capacitor in a direction along the predetermined direction, and a receiving portion for receiving movement of the wiring board and the capacitor due to a biasing force of the biasing portion are provided in the camera body.

2. The camera according to claim 1, wherein a cantilever portion, extending in a direction substantially perpendicular to the predetermined direction and capable of deflecting by a force at least in a direction opposite to the predetermined direction, is formed in the second body constituent member of the camera body and the cantilever portion constitutes the biasing portion.

3. The camera according to claim 1, wherein an accommodating chamber for accommodating the wiring board and the capacitor movably along the predetermined direction is formed in the camera body, and the accommodating chamber has a larger dimension in the predetermined direction than a maximum dimension of the wiring board and the capacitor in the predetermined direction.

4. The camera according to claim 3, wherein a cantilever portion, extending in a direction substantially perpendicular to the predetermined direction and capable of deflecting by a force at least in a direction opposite to the predetermined direction, is formed in the second body constituent member of the camera body and the cantilever portion constitutes the biasing portion.

5. The camera according to claim 1, wherein the lead wire of the capacitor is soldered to the wiring board.

* * * * *